UNITED STATES PATENT OFFICE.

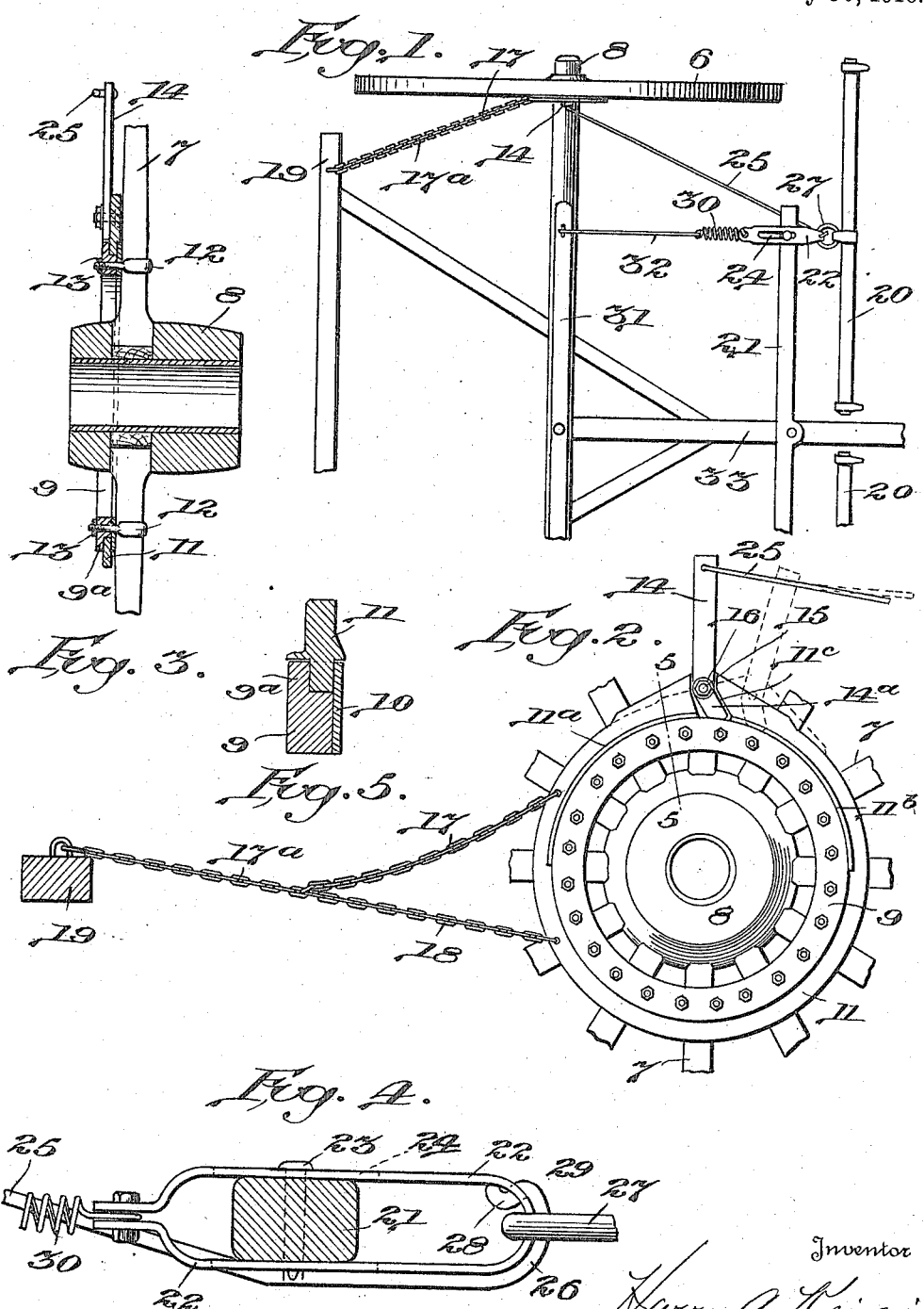

HARRY A. KEIGWIN, OF ORLANDO, FLORIDA.

STARTING DEVICE FOR VEHICLES.

1,184,962.  Specification of Letters Patent.  Patented May 30, 1916.

Application filed July 8, 1915. Serial No. 38,717.

*To all whom it may concern:*

Be it known that I, HARRY A. KEIGWIN, a citizen of the United States, residing at Orlando, in the State of Florida, have invented certain new and useful Improvements in Starting Devices for Vehicles, of which the following is a specification.

This invention relates to improvements in means for applying to vehicles the force of the draft through leverage whereby to increase the drafting force at the expense of time and cause the application of the draft through such leverage when starting a vehicle, or from time to time, as the same may be necessary, to relieve the draft from being applied directly to the load.

The invention has particular application to horsedrawn vehicles, and the object of the invention is to provide for the automatic shifting of the draft from a direct pull upon the vehicle to a pull through leverage, and vice versa, so that the pull through leverage may come into action at starting the vehicle or during its movement by causing the pulling to be intermittent.

It has also been the object of the invention to accomplish these mechanical results in a simple and practical manner, and by a construction which, while durable, is inexpensive, readily attached to a wagon, and not open to the usual objections due to the presence of such devices upon vehicles.

Primarily, the invention consists in combining with the vehicle wheel an annular friction element to revolve therewith, and mounting upon said element, to partially rotate thereon, a support having a lever carried thereby and adapted to fulcrum at one end on the said friction element to lock said lever and its support thereto, and means connecting the free end of said lever to the draft gear, whereby the initial pull will be through said leverage.

The invention also consists of other novel features in the construction and arrangement of parts, all as hereinafter described, and particularly set out in the appended claims.

In the accompanying drawing, Figure 1 is a plan view of a portion of the forward truck of a two-horse wagon showing the invention applied thereto; Fig. 2 an enlarged view showing the inside of a hub and spokes of a wheel with the equipment of the invention, the wheel spokes being shown broken away; Fig. 3 a vertical section taken through Fig. 2, and showing the lever and spokes in full lines; Fig. 4 a detail showing an enlarged side view of a sliding clevis and its associated parts, and Fig. 5 an enlarged vertical section taken on the line 5—5 of Fig. 2.

Referring to the drawing, it will be understood that the invention is applicable to any wheel of a vehicle, but is preferably applied, as shown, to the front wheel 6, or to both of the front wheels, and that what is shown in Fig. 1 in connection with the truck of a two-horse wagon may apply preferably to both wheels thereof, though the invention is capable of functioning successfully when used on one wheel of a two-horse truck.

On the inner side of the wheel 6 there is secured to the spokes 7 so as to be concentric with the hub 8, an annular or ring member 9 having an outer flange $9^a$, which member is combined with a second ring 10 of the full diameter of the first so as to provide a peripheral groove for a loose annular member 11. The two ring members 9 and 10 are provided with bolt holes which register and through which extend the threaded portions of the U-shaped clips 12, which embrace the spokes and clamp the said ring members together and to the spokes through the agency of the nuts 13 which are screwed down upon the face of the member 9. The loose annular member 11 which is thus confined between the rings 9 and 10, is provided on each side with a flange $11^a$ which extends around the upper half of the member 11 and over the periphery of the ring 9 to form a guard or cover to protect the bearing surfaces of the parts from foreign substances. On the opposite side of the member 11 a substantially similar projecting flange $11^b$ is formed to extend around the upper half thereof and cover the periphery of the ring member 10 for the same purposes.

The top portion of the member 11 is outwardly extended as shown in Fig. 2, and given an increased width laterally as shown in Fig. 5, to form a suitable portion for the mounting of the lever 14 which is pivotally secured to said ring member 11 within a side recess $11^c$ by means of the bolt 15 and its nut 16. The short arm or foot $14^a$ of said lever extends slightly oblique to the long arm of the lever and projects forward into contact with the rim of the main friction member 9, its contact portion being curved to conform generally to the curve of said member. It will therefore be seen that by pulling the lever forward the first action thereof will be to cause the foot of the lever to bear on the rim of the member 9 and with the bearing point as a fulcrum to cause a lifting of the member 11 with consequent binding or braking effect on the said member 9 on the opposite side of the hub, whereby the lever and its supporting friction or brake member 11 and the friction member 9 become locked so that the continued movement of the lever forward is accompanied by the turning of the wheel 6. The degree of movement of the lever and its connected ring member 11 is indicated in Fig. 2 by the dotted position shown, which practically represents the degree of wheel movement caused through said lever. To maintain the brake member 11 within a predetermined degree of rotation with the wheel, and also limit its backward movement, so that it will remain always in operative position, a stay chain 17 connects with the upper part of said ring while another stay chain 18 connects with the lower part thereof, which chains are connected to the hounds 19, or other part of the truck frame extending to the rear of the brake member, and preferably through the agency of a common connecting chain 17ª. These chains are so adjusted that chain 17 will limit the forward movement, while chain 18 will limit the backward movement, each becoming slack as the other tightens.

In order to cause the pulling force of the draft animals to come initially upon the lever 14, the swingle-trees 20 are each connected to the double tree 21 by means of a clevis 22, though only one such connection is shown, which clevis while embracing the end of the double tree is made in elongated form and adapted to have movement back and forth thereon equal to that desired for the movement of the lever. This clevis is secured by means of the bolt 23, the slot 24 therefor in each side of the clevis permitting the necessary movement back and forth. The lever 14 is connected with the clevis by means of the rod 25, the clevis end of which is bent up to form a hook 26 which projects through the ring 27, and is further bent to form a hook 28 which projects within an opening 29 in the forward end of the clevis and thus secures the lever connecting rod so that whatever movement is imparted to the clevis will be given the said rod. In this connection it will be observed that the clevis at its rear end is connected with a spring 30 which is connected to the sand bolster 31 of the truck, preferably by means of a rod 32. This spring 30 is under a constant tension and acts to pull back the clevis and the rod 25 upon any cessation of the draft force, which action will bring the lever 14 back and cause the resumption of the draft to again come upon the wheels through leverage until the clevis reaches its forward limit of movement, when the draft will come direct upon the double tree 21 and through it upon the wagon-tongue 33. When the draft is automatically shifted in this manner to the wagon tongue the action of the wheels in turning forward leaves the friction ring 9 free of the binding influence of the lever as with this movement the strain is removed from the lever and all binding of the parts ceases. In backing the foot of the lever is held slightly raised by the spring tension, its support 11 being held in its backward limit by the stay chain 18.

While the invention is illustrated in connection with a two-horse wagon, it is equally as applicable to one-horse vehicles, and with such the clevis 22 would be located centrally of the cross-bar of the shaft or other attaching member for the swingle-tree.

From the foregoing it will be seen that the invention by the employment of simple and inexpensive construction provides a practical means for automatically applying the draft to a vehicle through leverage in a manner that will not interfere with ordinary movement in either direction, and can be used not only in starting a vehicle but in maintaining its momentum in slow, heavy drafting.

What I claim is:

1. In a vehicle, the combination with a wheel thereof having an annular member fixed thereto, of a clamp member adapted to partially rotate and to have movement of bodily translation with respect to said annular member, and means connected to one of said members and adapted to engage the other for causing said clamp member to move into clamping engagement with the annular member, said means being adapted for connection to the draft device of the vehicle.

2. In a vehicle, the combination with a wheel thereof having an annular member fixed thereto, of a clamp member adapted to partially rotate and to be moved into clamping engagement with the annular member, a lever pivotally connected to the clamp member and having one end adapted to fulcrum on the annular member to move the clamp member into clamping engagement therewith and lock said lever to the wheel therethrough, and means for connecting said lever to the draft device of the vehicle.

3. In a vehicle, the combination with a wheel thereof having an annular member fixed thereto, of a clamp member adapted to partially rotate and to be moved into clamping engagement with the annular member, a lever carried by said clamping member and adapted to fulcrum on the annular member on the side thereof opposite to that engaged by the clamp member in clamping, and means for connecting the lever with the draft device of the vehicle.

4. In a vehicle, the combination with a wheel thereof having an annular member fixed thereto, of a clamp member adapted to partially rotate and to be moved into clamping engagement with the annular member, a lever carried by said clamping member and adapted to have one end fulcrum on the annular member at a point out of alinement with the center of said member and the pivotal point of said lever on the clamp member, and means connecting said lever to the draft device of the vehicle.

5. In a vehicle, the combination with a wheel thereof having an annular member fixed thereto, of a clamp member adapted to partially rotate and to be moved into clamping engagement with the annular member, a lever carried by said clamp member and adapted to have one end fulcrum on the annular member at a point in advance of the pivotal point of the lever on the clamp member, means connecting said lever with the draft device of the vehicle, and means for holding the outer end of the lever in its forward limit of movement whereby to cause its inner end to travel with the clamp member under the forward movement of the wheel to move said lever out of contact with the annular member.

6. In a vehicle, the combination with a wheel thereof having an annular member fixed thereto, of a clamp member adapted to partially rotate and to be moved into clamping engagement with the annular member, a lever carried by said clamp member and adapted to have one end fulcrum on the annular member, means for connecting said lever to the draft device of the vehicle, means for automatically actuating said lever to normally hold it in a position of disengagement with the annular member, and means for automatically returning said lever and clamp member to the starting position upon the cessation of the draft thereon.

7. In a vehicle, the combination with a wheel thereof having an annular member fixed thereto, of a friction ring adapted to partially rotate on said annular member and to be moved into clamping engagement therewith, a lever carried by said friction ring adapted to fulcrum at one end on said annular member to clamp the friction ring thereto, means connecting said lever to the draft device of the vehicle, and means for automatically returning said lever when freed of the draft action thereon.

8. In a vehicle, the combination with a wheel thereof having an annular member fixed thereto, of a clamp member adapted to rotate and to be moved into clamping engagement with the annular member, a lever carried by said clamp member and adapted to have one end fulcrum on the annular member, means connecting said lever to the draft device of the vehicle, and means connecting said clamp member to the vehicle independent of said lever, whereby to limit the rotation of the clamp member.

9. In a vehicle, the combination with a wheel thereof having an annular member fixed thereto provided with a peripheral groove, of a clamp ring rotatable within said groove and adapted to be moved into clamping engagement with the annular member, a lever carried by the clamping ring and adapted to have one end fulcrum on the annular member, to cause said clamp member to move into clamping engagement with said member, and means for connecting said lever with the draft device of the vehicle.

In testimony whereof I affix my signature.

HARRY A. KEIGWIN.

Copies of this patent may be obtained for five cents each, by addressing the "Commissioner of Patents, Washington, D. C."